United States Patent
Zhao et al.

(10) Patent No.: US 9,294,383 B2
(45) Date of Patent: Mar. 22, 2016

(54) BASELINE WANDER COMPENSATING METHOD, BASELINE CALIBRATION MODULE AND ETHERNET TRANSCEIVER USING THE SAME

(71) Applicant: ALI CORPORATION, Hsinchu (TW)

(72) Inventors: Dan Zhao, Shanghai (CN); Bo Liu, Shanghai (CN)

(73) Assignee: ALI CORPORATION, Hsinchu (TW)

( * ) Notice: Subject to any disclaimer, the term of this patent is extended or adjusted under 35 U.S.C. 154(b) by 170 days.

(21) Appl. No.: 14/306,282

(22) Filed: Jun. 17, 2014

(65) Prior Publication Data

US 2015/0271048 A1 Sep. 24, 2015

(30) Foreign Application Priority Data

Mar. 20, 2014 (CN) .......................... 2014 1 0105145

(51) Int. Cl.
*H04L 12/26* (2006.01)
(52) U.S. Cl.
CPC ...................................... *H04L 43/50* (2013.01)
(58) Field of Classification Search
None
See application file for complete search history.

(56) References Cited

U.S. PATENT DOCUMENTS

| | | | | |
|---|---|---|---|---|
| 8,107,573 B2 * | 1/2012 | Chang | ................ | H04L 25/061 375/317 |
| 2006/0120491 A1 * | 6/2006 | Yen | ................ | H03G 3/3089 375/345 |
| 2011/0317564 A1 * | 12/2011 | Saibi | ................ | H04L 43/50 370/249 |
| 2015/0061758 A1 * | 3/2015 | Hsu | ................ | A61B 5/7203 327/553 |

* cited by examiner

*Primary Examiner* — Otis L Thompson, Jr.
(74) *Attorney, Agent, or Firm* — Li & Cai Intellectual Property (USA) Office

(57) ABSTRACT

The present disclosure illustrates a baseline wander compensating method adapted for compensating baseline wander induced in an Ethernet transceiver. The baseline wander compensating method comprises following steps. Firstly, an output packet is detected. Next, a detection result of the output packet and a predetermined value are compared, and a control signal is generated correspondingly. Based on the control signal, a first calibration signal or a second calibration signal is selected, and a calibrating calculation is executed for the selected one of the first calibration signal and a second calibration signal. Next, an input signal is compensated according to a baseline calibration value generated from the calibrating calculation.

23 Claims, 5 Drawing Sheets

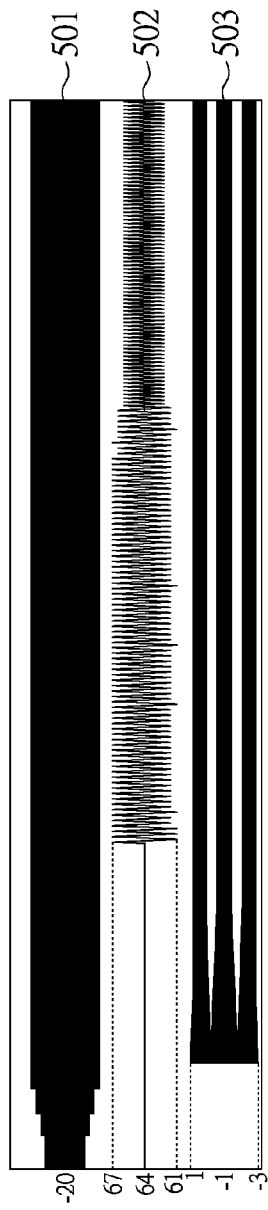
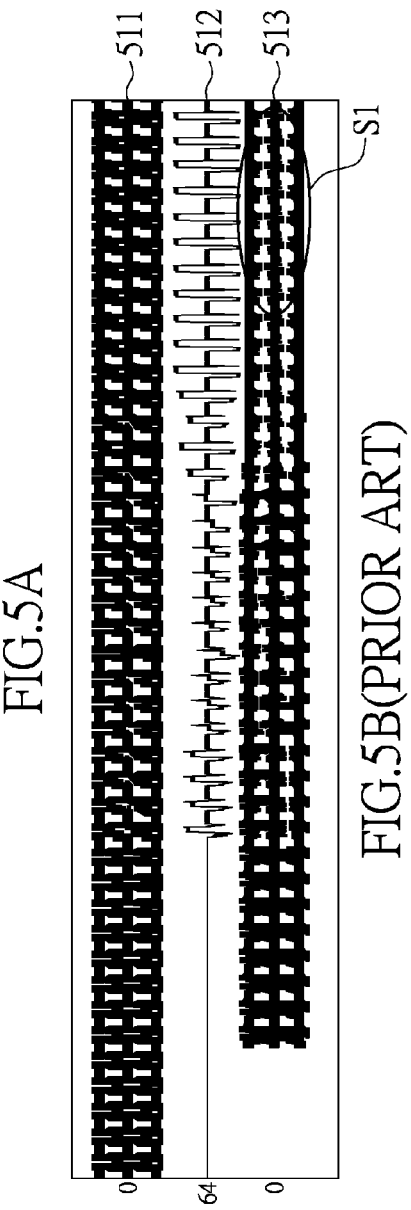
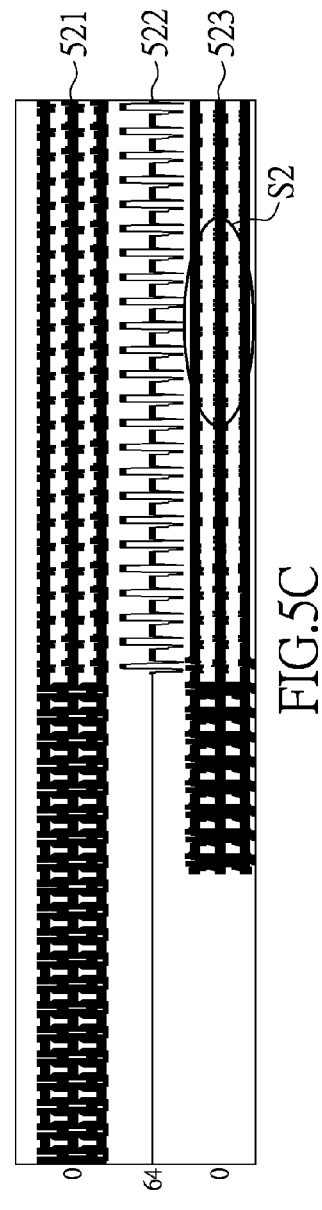
FIG.5A
FIG.5B(PRIOR ART)
FIG.5C

BASELINE WANDER COMPENSATING METHOD, BASELINE CALIBRATION MODULE AND ETHERNET TRANSCEIVER USING THE SAME

BACKGROUND

1. Technical Field

The present disclosure relates to a baseline wander compensating method, in particular, to a baseline wander compensating method adapted for a baseline calibration module and Ethernet transceiver thereof.

2. Description of Related Art

In current electronic communication system, the trend is that digital data transmission becomes more important. Besides, as user's demand for high speed transmission increases, it further stimulates the development of Ethernet. However, during data transmission process, the shape of modulation wave received by an Ethernet transceiver is affected easily by channel distortion, which resulting in effect of killer packet and baseline wander. If the baseline wander cannot be compensated appropriately, error rate of the transceiver will be increased.

Please refer to FIG. 1 which is a block view of traditional Ethernet transceiver. The Ethernet transceiver 1 comprises an analog-digital converting unit 101, a compensation unit 102, an equalizer 103, a slicer 104, an adder 105 and an estimation unit 106. The compensation unit 102 is coupled to the analog-digital converting unit 101, and the equalizer 103 is coupled to the compensation unit 102, and the slicer 104 is coupled to the equalizer 103, and the adder 105 is coupled to the equalizer 103 and the slicer 104, and the estimation unit 106 is coupled to the adder 105 and the compensation unit 102.

In traditional Ethernet transceiver 1, an input signal IN_S is converted to a digital signal by the analog-digital converting unit 101. Next, the signal generated from the digital signal being processed by the equalizer 103 and the signal generated from the digital signal being processed by the equalizer 103 and the slicer 104 are added by the adder 105, and the added signal is transmitted to the estimation unit 106 for calculation of baseline wander. Then, the estimation unit 106 transmits the calculation result to the compensation unit 102 to execute compensation for the input signal IN_S.

According to the above mentioned, the traditional Ethernet transceiver 1 just executes compensation for input signal in digital domain. In detail, traditional Ethernet transceiver 1 utilizes a digital domain compensation algorithm with seven-bit or eight-bit high analog-digital converting resolution. Therefore, the traditional Ethernet transceiver 1 is limited to use regular loop bandwidth work mode but is hard to compensate for a normal packet and a killer packet simultaneously during signal process.

SUMMARY

The present embodiment provides a baseline wander compensating method adapted for compensating baseline wander induced in an Ethernet transceiver. The baseline wander compensating method comprises following steps of: detecting an output packet; comparing a detection result of output packet and a predetermined value and generating a control signal correspondingly; based on the control signal, selecting a first calibration signal or a second calibration signal, and executing a calibrating calculation for the selected one of the first calibration signal and the second calibration signal; compensating an input signal according to a baseline calibration value generated from the calibrating calculation.

Embodiment according to the present disclosure provides a baseline calibration module adapted for compensating baseline wander induced in an Ethernet transceiver. The baseline calibration module comprises a packet detector and a calibrating calculation unit. The calibrating calculation unit is coupled to a packet detector. The packet detector is configured to operatively detect an output packet, and compare a detection result of the output packet and predetermined value, and generate a control signal correspondingly. The calibrating calculation unit is configured to operatively select a first calibration signal or a second calibration signal, and based on control signal execute a calibrating calculation for the selected one of the first calibration signal and the second calibration signal to generate baseline calibration value which is used to compensate an input signal.

Embodiment according to the present disclosure provides an Ethernet transceiver. The Ethernet transceiver comprises an analog circuit and a digital circuit which is coupled to the analog circuit. The analog circuit is configured to receive an input signal, and output a digital signal based on the input signal, wherein the input signal is an analog signal. The digital circuit comprises an equalizer, a slicer and a baseline calibration module. The baseline calibration module comprises a packet detector and a calibrating calculation unit. The slicer is coupled to the equalizer, and the baseline calibration module is coupled to the equalizer and the slicer. The calibrating calculation unit is coupled to the packet detector. The digital signal is transformed into number sequence of output packet by the equalizer and the slicer. The baseline calibration module is adapted for compensating baseline wander induced in the Ethernet transceiver. The packet detector is configured to operatively detect an output packet, and compare a detection result of the output packet and a predetermined value, and generate a control signal correspondingly. The calibrating calculation unit is configured to operatively select a first calibration signal or a second calibration signal, and based on the control signal execute a calibrating calculation for the selected one of the first calibration signal and the second calibration signal to generate baseline calibration value which is used to compensate an input signal.

To sum up, according to the baseline wander compensating method and the baseline calibration module provided by the present disclosure, the Ethernet transceiver can adjust to the best performance self-adaptively between receipts of the normal packet and the killer packet. Besides, the Ethernet transceiver can adjust input and loop bandwidth to calculate baseline wander adaptively based on the analog domain and the digital domain compensation of the baseline wander compensating method and baseline calibration module according to the present disclosure. Compared with other traditional baseline wander compensation which uses digital domain compensating manner and is limited to use regular loop bandwidth, the baseline wander compensating method, the baseline calibration module and the Ethernet transceiver according to the present disclosure can calculate baseline calibration values for both of normal packet and killer packet, and further have advantages of low complex and low cost.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 5A is a waveform of simulation signal as the Ethernet transceiver is receiving a normal packet, according to the embodiment of the present disclosure.

FIG. 5B is a waveform of simulation signal as the traditional Ethernet transceiver is receiving a killer packet.

FIG. 5C is a waveform of simulation signal as the Ethernet transceiver is receiving a killer packet, according to the embodiment of the present disclosure.

DESCRIPTION OF THE EXEMPLARY EMBODIMENTS

Figure 1:
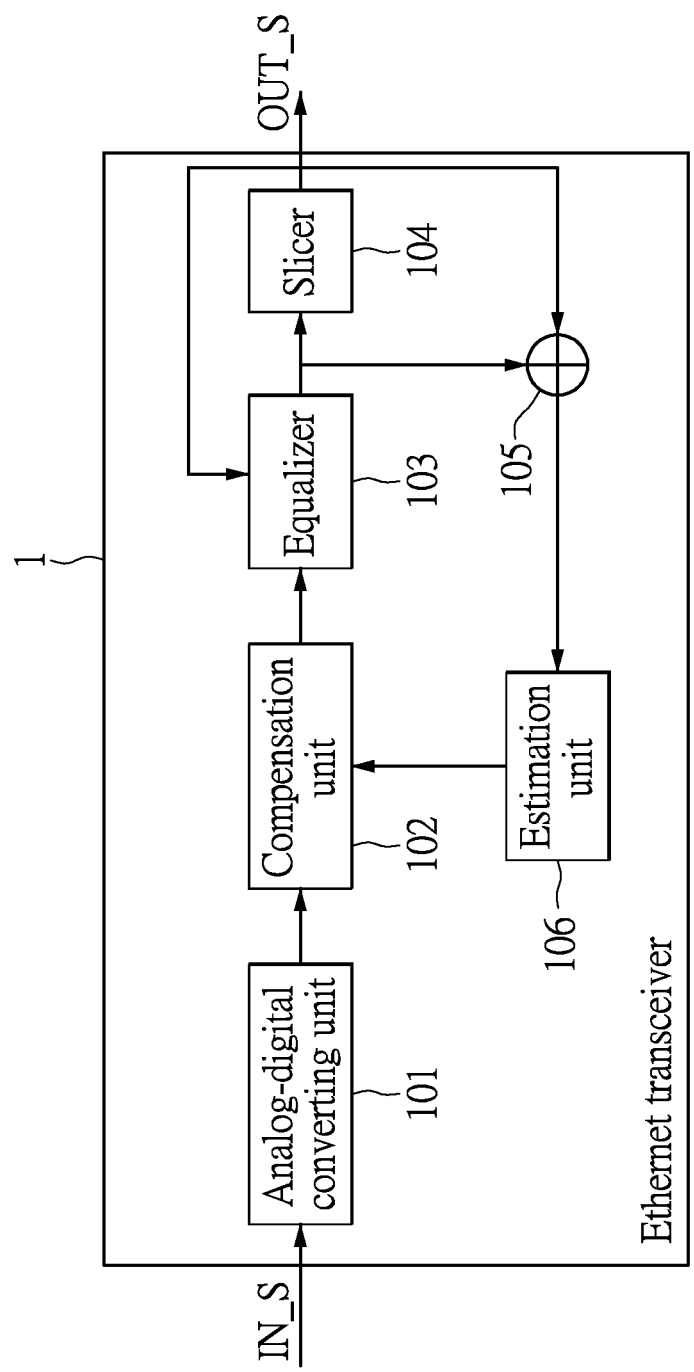
FIG. 1 is a block diagram of traditional Ethernet transceiver.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 2:
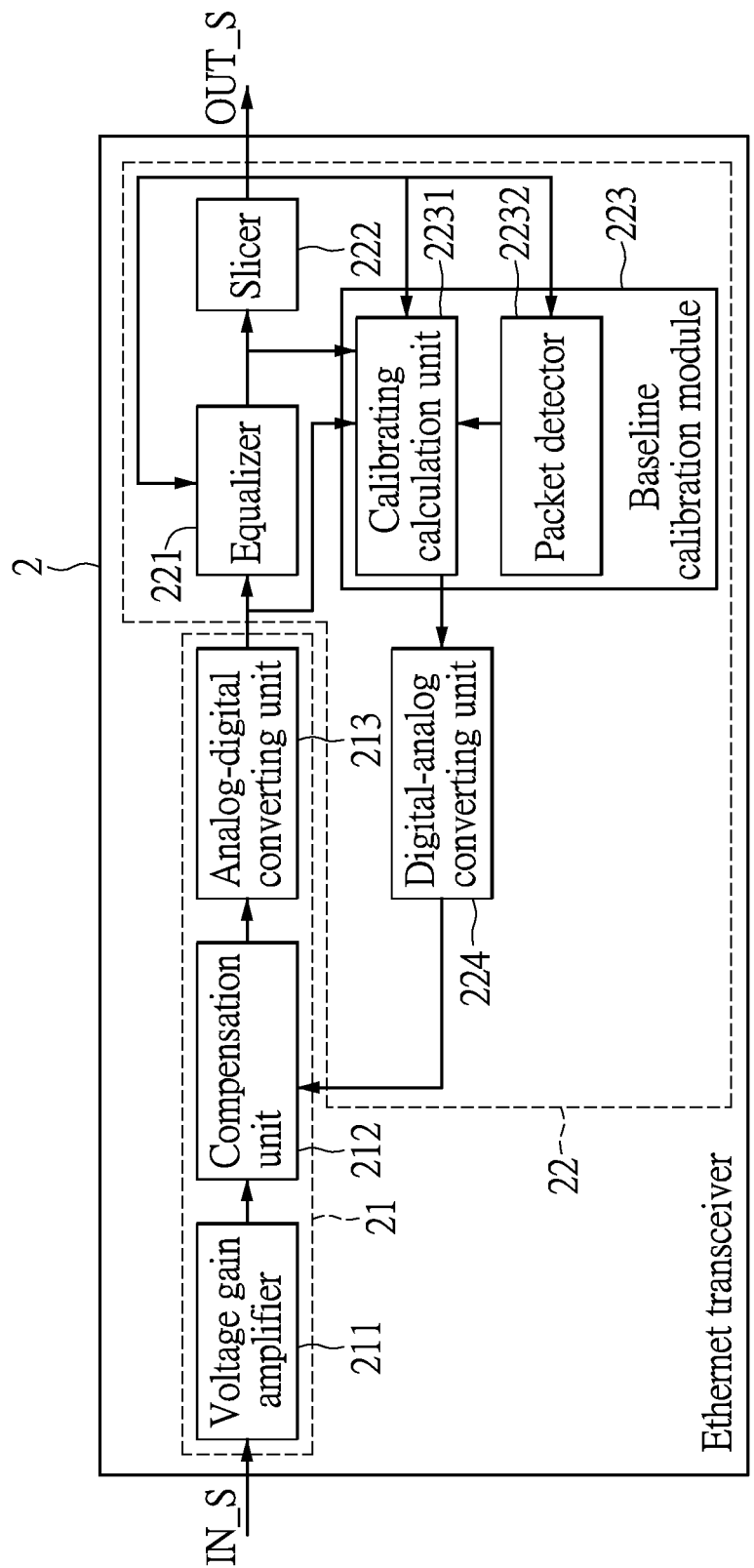
FIG. 2 is a block diagram of an embodiment of an Ethernet transceiver according to the present disclosure.

Please refer to FIG. 2 which is block view of an embodiment of an Ethernet transceiver according to the present disclosure. The Ethernet transceiver 2 comprises an analog circuit 21 and a digital circuit 22, and the digital circuit 22 is coupled to the analog circuit 21. In detail, the analog circuit 21 comprises a voltage gain amplifier 211, a compensation unit 212 and an analog-digital converting unit 213. The digital circuit 22 comprises an equalizer 221, a slicer 222, a baseline calibration module 223 and a digital-analog converting unit 224. The baseline calibration module 223 comprises a calibrating calculation unit 2231 and a packet detector 2232. The compensation unit 212 is coupled to the voltage gain amplifier 211, and the analog-digital converting unit 213 is coupled to the compensation unit 212. The equalizer 221 is coupled to the analog-digital converting unit 213, and the slicer 222 is coupled to the equalizer 221, and the baseline calibration module 223 is coupled to the analog-digital converting unit 213, the equalizer 221 and the slicer 222. The digital-analog converting unit 224 is coupled to the baseline calibration module 223, and the digital-analog converting unit 224 is coupled to the compensation unit 212.

According to the embodiment of the present disclosure, the Ethernet transceiver 2 receives an input signal IN_S via the analog circuit 21. In detail, the input signal IN_S is an analog signal, the input signal IN_S is amplified by the voltage gain amplifier 211, and the input signal IN_S is converted from analog signal to digital signal by the analog-digital converting unit 213. Those skilled in the art would realize functions and components of the voltage gain amplifier 211 and the analog-digital converting unit 213. However, components, such as the voltage gain amplifier 211 and the analog-digital converting unit 213, are not important innovation in technical concept of the present disclosure, so their detail description is omitted. It is noted that the compensation unit 212 receives the amplified input signal IN_S from the voltage gain amplifier 211. Based on the baseline calibration result calculated by the digital circuit 22, the compensation unit 212 operatively compensates the input signal IN_S.

According to the embodiment of the present disclosure, the analog circuit 21 converts the input signal IN_S from analog signal to digital signal. Later, the digital circuit 22 receives the digital signal, and generates an output packet OUT_S by the equalizer 221 and the slicer 222 correspondingly. The output packet OUT_S has a number sequence. That is, the number sequence of the output packet OUT_S is generated by the equalizer 221 and the slicer 222.

The signal transmitted in the channel is affected by the multipath interference or shadow effect due to block of shelter in the path, so it results in increase of error rate of the received input signal IN_S. Therefore, the equalizer 221 performs an equalization process on the digital signal in digital domain, so as to decrease the error rate in channel transmission. Briefly, the equalizer 221 operatively provides a transfer function corresponding to the effect by which the input signal IN_S is induced in the channel, and filters the digital signal according to the transfer function to compensate for the effect on the input signal IN_S caused by the channel.

The slicer 222 determines the output packet OUT_S based on the filtered digital signal from the equalizer 221. According to the embodiment of the present disclosure, the slicer 222 uses MLT-3 symbol such as symbol −1, symbol 0 and symbol −1 of a three-levels system, to generate corresponding voltage level based on value of filtered digital signal. For example, if value of the filtered digital signal falls in the first range of value, the slicer 222 generates symbol −1 indicative of voltage level of −1 v; if value of the filtered digital signal falls in the second range of value, between a first value and a second value, the slicer 222 generates symbol 0 indicative of voltage level of 0 v; if value of the filtered digital signal falls in the third range of value, the slicer 222 generates symbol +1 indicative of voltage level of 1 v. In the other word, according to the embodiment of the present disclosure, said number sequence is a number sequence consisted of −1, 0 and +1. However, this is just an illustrative example for the present disclosure, and it is not limited thereto.

The baseline calibration module 223 compensates the input signal IN_S received by the Ethernet transceiver 2 for the baseline wander induced in the channel. In more detail, the calibrating calculation unit 2231 of the baseline calibration module 223 is coupled to the analog-digital converting unit 213, the equalizer 221 and the slicer 222. The packet detector 2232 of the baseline calibration module 223 is coupled to the slicer 222. The analog-digital converting unit 213 converts the analog signal to the digital signal, and transmits the digital signal to the baseline calibration module 223 for subsequent digital signal process.

In more detail, the calibrating calculation unit 2231 of the baseline calibration module 223 receives the first calibration signal and the second calibration signal. The first calibration signal is the digital signal generated from the input signal IN_S converted by the analog-digital converting unit 213 and filtered by the equalizer 221. And the second calibration signal is the digital signal generated from the input signal IN_S converted by the analog-digital converting unit 213.

The packet detector 2232 of the baseline calibration module 223 detects the output packet OUT_S output from the slicer 222, and compares the detection result and a predetermined value to generate a control signal CTRL_S, in order to judge that the output packet OUT_S is a normal packet or a killer packet. Furthermore, when the packet detector 2232 detects that the output packet OUT_S is a normal packet or a regular packet, the calibrating calculation unit 2231 selects a first calibration parameter according to the control signal CTRL_S, so that the calibrating calculation unit 2231 executes calibrating calculation for the received first calibration signal based on the first calibration parameter. When the packet detector 2232 detects that the output packet OUT_S is a killer packet, the calibrating calculation unit 2231 selects a second calibration parameter based on the control signal CTRL_S, so that the calibrating calculation unit 2231 executes calibrating calculation for the received second calibration signal based on the second calibration parameter. The second calibration parameter is larger than the first calibration parameter.

Furthermore, the detection result is generated by an absolute value of sum of continuous numbers of number sequence of output packet OUT_S. For example, the detection result is generated by the absolute value of sum of received continuous 256 numbers. Those skilled in the art would realize above way for obtaining the detection result is only for example, and it is not limited thereto. For example, the amount of continuous numbers to be added can be adjusted upon demand for condition of actual use or user's experience.

It is noted that comparison between the detection result and the predetermined value is to select appropriate compensation way based on condition of output packet OUT_S, such as normal packet or killer packet, so as to implement precise compensation. That is, different calibration parameter, such as the first calibration parameter or second calibration parameter, is selected according to different output packet OUT_S correspondingly. Besides, the predetermined value, the first calibration parameter and the second calibration parameter to be compared with detection result can be adjusted by the packet detector 2231 according to user's experience and condition of actual use.

After the calibrating calculation unit 2231 executes calibrating calculation for the selected one of the first calibration signal or the second calibration signal, selected by the control signal CTRL_S, based on corresponding calibration parameter (the first calibration parameter or the second calibration parameter), the baseline calibration value is generated. Next, the calibrating calculation unit 2231 transmits the baseline calibration value to the digital-analog converting unit 224 for being converted to another analog signal, so as to compensate the input signal IN_S.

Figure 3:
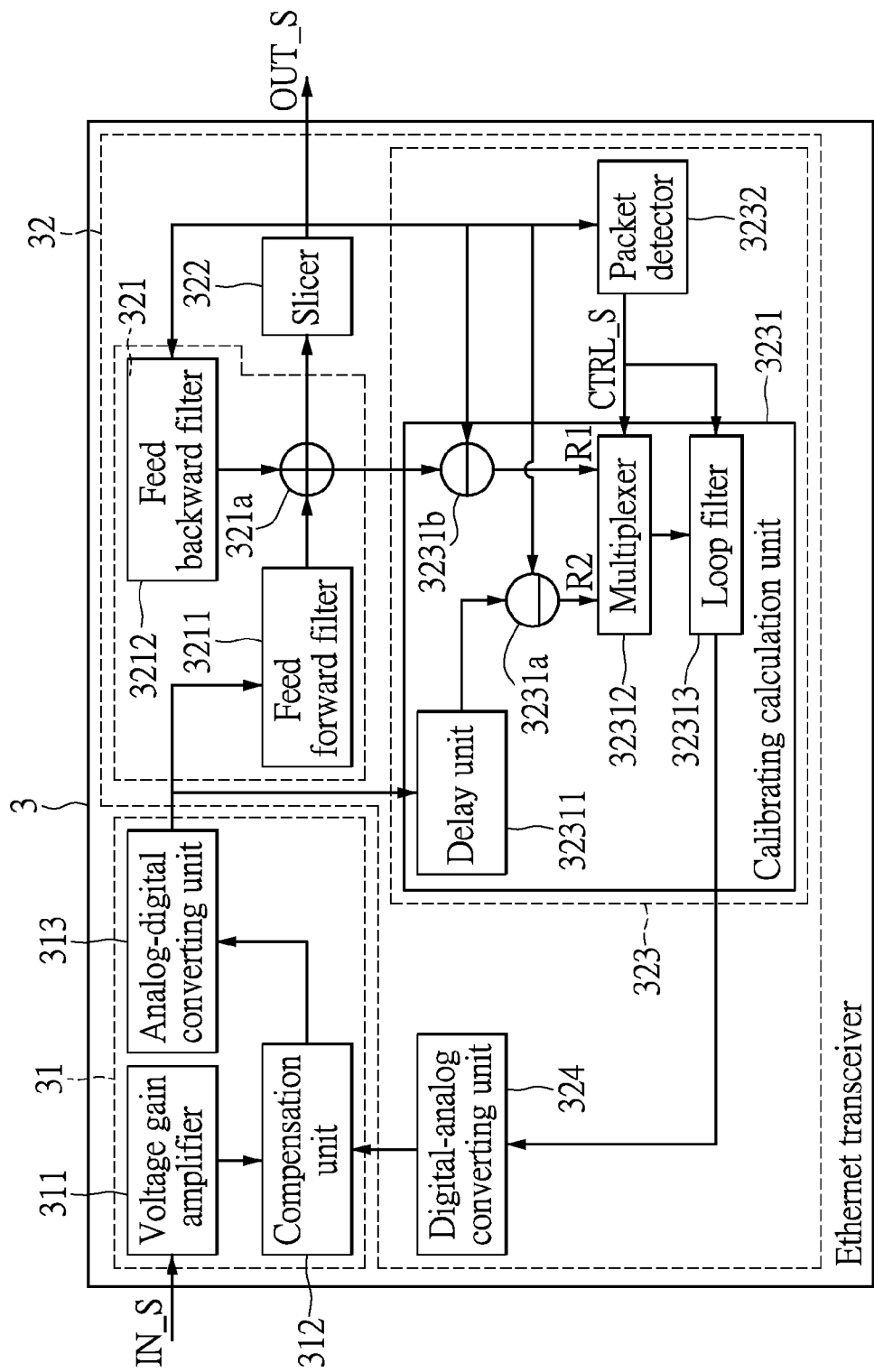
FIG. 3 is a detail block diagram of the embodiment of the Ethernet transceiver according to the present disclosure.

Please refer to FIG. 3 which is a detail block view of the embodiment of the Ethernet transceiver according to the present disclosure. The Ethernet transceiver 3 comprises an analog circuit 31 and a digital circuit 32, and the digital circuit 32 is coupled to the analog circuit 31. The analog circuit 31 comprises a voltage gain amplifier 311, a compensation unit 312 and an analog-digital converting unit 313. The digital circuit 32 comprises an equalizer 321, a slicer 322, a baseline calibration module 323 and a digital-analog converting unit 324. The baseline calibration module 323 comprises a calibrating calculation unit 3231 and a packet detector 3232. These components and their connect relationships are the same as that shown in FIG. 2, so detail description is omitted. The followings description just illustrates the differences between the FIG. 3 and the FIG. 2.

In more detail, the equalizer 321 comprises a feed forward filter 3211, a feed backward filter 3212 and an adder 321a. The calibrating calculation unit 3231 comprises a delay unit 32311, a multiplexer 32312, a loop filter 32313, and subtractors 3231a and 3231b. The feed forward filter 3211 is coupled to the analog-digital converting unit 313, and the feed backward filter 321 is coupled to the slicer 322, and the adder 321a is coupled to the feed forward filter 3211 and the feed backward filter 321. The delay unit 32311 is coupled to the analog-digital converting unit 313, and the subtractor 3231a is coupled to the slicer 322 and the delay unit 32311, and the subtractor 3211b is coupled to the slicer 322 and the adder 321a. The multiplexer 32312 is coupled to the packet detector 3232 and the subtractors 3231a and 3231b. The loop filter 32313 is coupled to the multiplexer 32312 and the packet detector 3232. The digital-analog converting unit 324 is coupled to the loop filter 32313.

In the equalizer 321, the feed forward filter 3211 receives the input signal IN_S which is converted to digital signal by the analog-digital converting unit 313. The feed backward filter 321 receives an output packet OUT_S generated from the slicer 322. Next, the adder 321a adds output of the feed forward filter 3211 and output of the feed backward filter 321 to generate the filtered digital signal, and the filtered digital signal is then output to the slicer 322 for further determining the number sequence of the output packet OUT_S.

The calibrating calculation unit 2231 of the baseline calibration module 223 receives the first calibration signal and the second calibration signal. In more detail, the first calibration signal is passed through the first calibration signal path R1 formed by the adder 321a, the slicer 322 and a subtractor 3231b. By the subtractor 3231b, the output of the adder 321a is subtracted from the output of the slicer 322 to generate the first calibration signal. In the other word, the filtered digital signal from the equalizer 321 is subtracted from the number sequence of the output packet OUT_S by the subtractor 3231b to generate the first calibration signal. The second calibration signal is passed through the second calibration signal path R2 formed by the delay unit 32311, the equalizer 321, the slicer 322 and the subtractor 3231a. By the subtractor 3231a, the output of the delay unit 32311 is subtracted from the output of the slicer 322 to generate the second calibration signal. In the other word, the delayed digital signal from the delay unit 32311 is subtracted from the number sequence of the output packet OUT_S by the subtractor 3231a to generate the second calibration signal. It is noted that, according to the embodiment of the present disclosure, the digital signal output from the analog-digital converting unit 313 is delayed by the delay unit 32311, so that the second calibration signal and the first calibration signal can be simultaneous.

The multiplexer 32312 is a data multiplexer which is a component configured to operatively select one signal from multiple input signals and output the selected signal. According to the embodiment of the present disclosure, the multiplexer 32312 receives the first calibration signal from the first calibration signal path R1, the second calibration signal from the second calibration signal path R2, and the control signal CTRL_S. Based on the control signal CTRL_S, The multiplexer 32312 switches receipt or output of one of the first calibration signal and the second calibration signal on the first calibration signal path R1 and the second calibration path R2.

The loop filter 32313 is a low pass filter and comprises a RC circuit or an amplifier, and operatively removes the carrier frequency components or harmonics in the received signal. Based on the control signal CTRL_S, the loop filter 32313 selects the first calibration parameter or the second calibration parameter to correspond the selected one of the first calibration signal or the second calibration signal selected by the multiplexer 32312 respectively for executing the calibrating calculation. According to the embodiment of the present disclosure, the loop filter 32313 is an integrator which is also a first-order low pass filter. For example, the loop filter 32313 may be an integrator having transfer function of $gz^{-1}/(1-z^{-1})$, wherein g is the selected one of the first calibration parameter or the second calibration parameter based on the control signal CTRL_S, that is, the first calibration parameter and the second calibration parameter are gains of the low pass filter.

Figure 4:
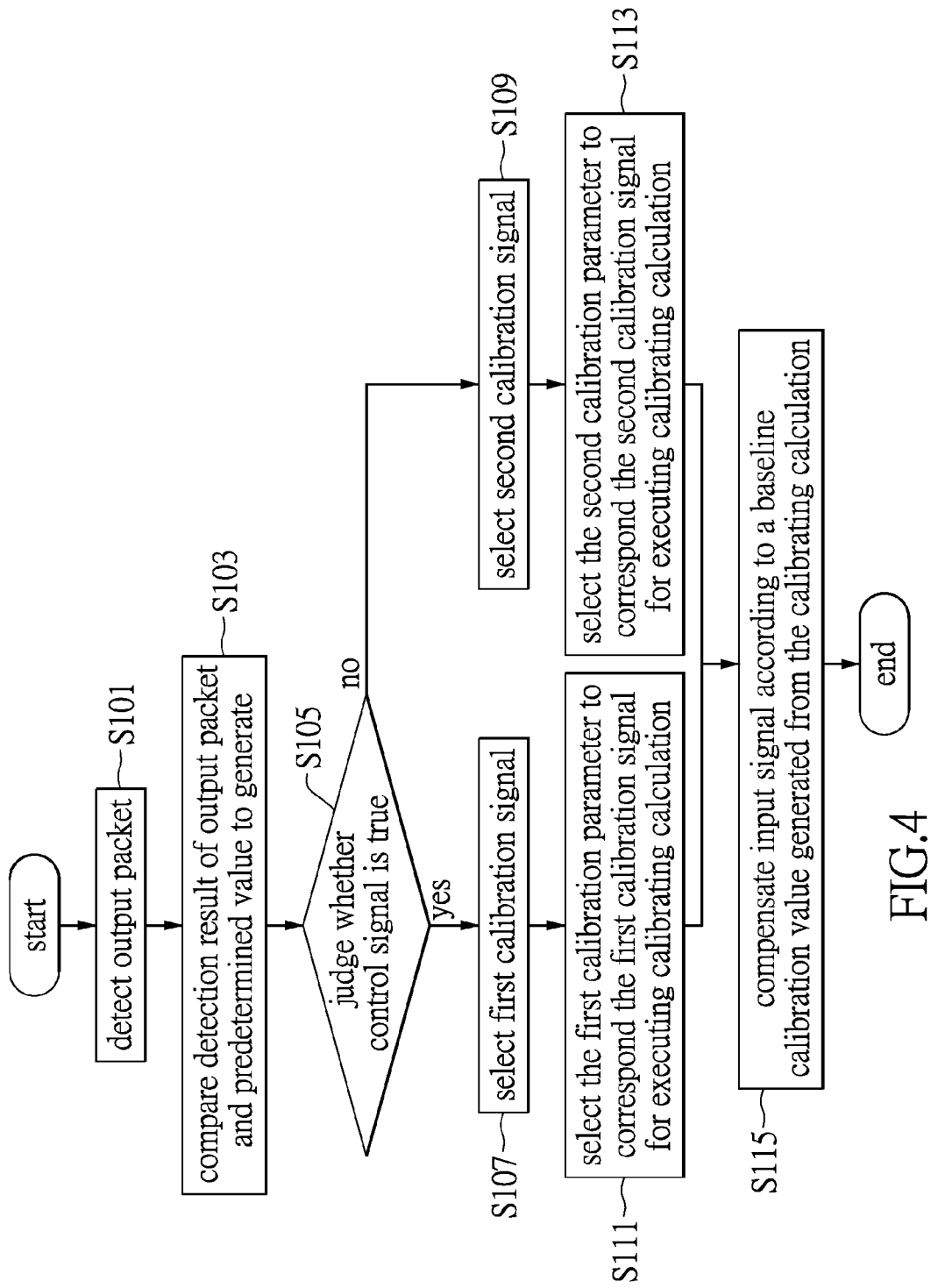
FIG. 4 is a flow diagram of an embodiment of a baseline wander compensating method according to the present disclosure.

Please refer to FIG. 4 which is a flow of an embodiment of a baseline wander compensating method according to the present disclosure. The baseline wander compensating method comprises the following steps. In step S101, the output packet is detected. In step S103, a detection result of the output packet and a predetermined value are compared to generate a control signal correspondingly. In step S105, it is determined whether the control signal is true, and if the control signal is true, it indicates that the output packet is a regular packet or a normal packet; if the control signal is not true, it indicates that the output packet is a killer packet. If the control signal is true, step S107 is executed after the step S105; if the control signal is not true, step S109 is executed after the step S105.

If the control signal is true, it means that the output packet is the normal packet or the regular packet, the first calibration signal is selected in step S107 and a first calibration parameter corresponding to the first calibration signal is selected and the calibrating calculation is executed in step S111. If the control signal not is true, it means that the output packet is the killer packet, the second calibration signal is selected in step S109 and a second calibration parameter corresponding to the second calibration signal is selected and the calibrating calculation is executed in step S113. In step S115, an input signal is compensated according to a baseline calibration value generated from the calibrating calculation executed in the step S111 or step S113.

Please refer to both of FIG. 3 and FIG. 4, in step S101 the packet detector 3232 detects the output packet OUT_S generated by the slicer 322. In more detail, the input signal INS is converted into the digital signal by the analog-digital converting unit 313, the digital signal is input into the equalizer 321 and the slicer 322 to generate the number sequence of output packet OUT_S which is then detected by the packet detector 3232.

In step S103, the packet detector 3232 compares a detection result of the output packet OUT_S and a predetermined value and generates a control signal CTRL_S correspondingly. The detection result is generated by an absolute value of sum of continuous numbers of number sequence of output packet OUT_S.

Next, in step S105, the multiplexer 32312 further judges whether the control signal CTRL _S is true or not, to select one of the first calibration signal and the second calibration signal based on the control signal CTRL to execute the calibrating calculation. In more detail, when the packet detector 3232 detects that the output packet OUT_S is the regular packet or the normal packet, the step S107 is executed and the first calibration signal is selected; when the packet detector 3232 detects that the output packet OUT_S is the killer packet, the step S109 is executed and the second calibration signal is selected.

In step S111, based on the control signal CTRL_S, the loop filter 32313 selects the first calibration parameter to correspond the first calibration signal selected by the multiplexer 32312 for executing the calibrating calculation. In step S113, based on the control signal CTRL_S, the loop filter 32313 selects the second calibration parameter to correspond the second calibration signal selected by the multiplexer 32312 for executing the calibrating calculation.

Finally, in step S111, the loop filter 32313 compensates an input signal IN_S according to a baseline calibration value generated from the calibrating calculation. In more detail, the baseline calibration value generated by the loop filter 32313 is converted to an analog signal by the digital-analog converting unit 324 first, and the analog signal is then used to compensate the input signal IN_S.

Please refer to FIG. 5A which is a waveform of simulation signal as the Ethernet transceiver is receiving a normal packet, according to the embodiment of the present disclosure. The simulation signal 501 is an eye pattern output from the analog-digital converting unit when the Ethernet transceiver according to the present disclosure transmits the regular packet on 100 m cable. The simulation signal 502 is an estimation waveform of the baseline wander when the Ethernet transceiver according to the present disclosure transmits the regular packet on 100 m cable. The simulation signal 503 is an eye pattern of output from the equalizer when the Ethernet transceiver according to the present disclosure transmits the regular packet on 100 m cable.

According to the embodiment of the present disclosure, different compensation is selected corresponding to different type of output packet. When the output packet detected by the packet detector of the baseline wander compensating method, the baseline calibration module, and Ethernet transceiver is regular packet or normal packet, the first calibration signal is received from the first calibration signal path formed by the adder, slicer and subtractor, and the first calibration parameter is selected further to execute the calibrating calculation for the first calibration signal. In FIG. 5A, it is obvious that values of the baseline wander induced in regular packet fall in a range between 61 and 67, and the reference value is 64, so the fluctuation is not large.

Please refer to both of FIG. 5B and FIG. 5C. FIG. 5B is a waveform of simulation signal as the traditional Ethernet transceiver is receiving a killer packet. FIG. 5C is a waveform of simulation signal as the Ethernet transceiver is receiving a killer packet, according to the embodiment of the present disclosure. The simulation signal 511 is an eye pattern output from the analog-digital converting unit when the Ethernet transceiver according to the traditional transmits the killer packet on 0 m cable. The simulation signal 512 is an estimation waveform of the baseline wander when the Ethernet transceiver according to the traditional transmits the killer packet on 0 m cable. The simulation signal 513 is an eye pattern of output from the equalizer when the Ethernet transceiver according to the traditional transmits the killer packet on 0 m cable. The simulation signal 521 is an eye pattern of output from the analog-digital converting unit when the Ethernet transceiver according to the present disclosure transmits the killer packet on 0 m cable. The simulation signal 522 is an estimation waveform of the baseline wander when the Ethernet transceiver according to the present disclosure transmits the killer packet on 0 m cable. The simulation signal 523 is an eye pattern of output from the equalizer when the Ethernet transceiver according to the present disclosure transmits the killer packet on 0 m cable.

In FIG. 5B, it is obvious that region S1 of eye pattern output from the equalizer is not clear when traditional Ethernet transceiver transmits the killer packet. That is, the traditional Ethernet transceiver does not compensate for the killer packet adaptively, and the Ethernet transceiver is interfered or affected by a certain degree. When the output packet detected by the packet detector of the baseline wander compensating method, the baseline calibration module, and Ethernet transceiver is the killer packet, the second calibration signal is received from the second calibration signal path formed by the adder, slicer and subtractor, and the second calibration parameter is selected further to execute the calibrating calculation for the second calibration signal. Therefore, in FIG. 5C, it is obvious that region S2 of this pattern output from the equalizer is clear when the Ethernet transceiver according to the present disclosure transmits the killer packet.

To sum up, according to the baseline wander compensating method to and the baseline calibration module provided by the present disclosure, the Ethernet transceiver can adjust to the best performance self-adaptively between receipts of the normal packet and the killer packet. Besides, the Ethernet transceiver can adjust input and loop bandwidth self-adaptively to calculate baseline wander by compensation in analog domain and digital domain. Therefore, compared with other traditional baseline wander compensation which uses digital domain compensating manner and is limited to use regular loop bandwidth, the baseline wander compensating method, the baseline calibration module and the Ethernet transceiver according to the present disclosure can calculate baseline calibration values for both of normal packet and killer packet, and further have advantages of low complex and low cost.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A baseline wander compensating method, adapted for compensating baseline wander induced in an Ethernet transceiver, the baseline wander compensating method comprising:
   detecting an output packet;
   comparing a detection result of the output packet and a predetermined value, and generating a control signal correspondingly;
   based on the control signal, selecting a first calibration signal or a second calibration signal, and executing a calibrating calculation for the selected one of the first calibration signal and the second calibration signal; and
   compensating an input signal according to a baseline calibration value generated from the calibrating calculation.

2. The baseline wander compensating method according to claim 1, before the step of detecting the output packet, the input signal being an analog signal and converted to a digital signal by an analog-digital converting unit.

3. The baseline wander compensating method according to claim 2, wherein the digital signal is transformed into a number sequence of the output packet by an equalizer and a slicer.

4. The baseline wander compensating method according to claim 3, in the step of comparing the detection result of the output packet and the predetermined value to generate the control signal, wherein the detection result is generated from an absolute value of sum of all numbers of the number sequence of the output packet.

5. The baseline wander compensating method according to claim 3, in step of selecting the first calibration signal or the a second calibration signal based on the control signal and executing the calibrating calculation for the selected one of the first calibration signal and the second calibration signal, wherein based on the control signal a first calibration parameter is selected to execute the calibrating calculation for the first calibration signal, or a second calibration parameter is selected to execute the calibrating calculation for the second calibration signal.

6. The baseline wander compensating method according to claim 5, wherein when the output packet is a normal packet, the first calibration parameter is selected to execute the calibrating calculation for the first calibration signal based on the control signal, and when the output packet is a killer packet, the second calibration parameter is selected to execute the calibrating calculation for the second calibration signal based on the control signal, wherein the second calibration parameter is larger than the first calibration parameter.

7. The baseline wander compensating method according to claim 5, wherein the first calibration signal is a signal generated from the digital signal being filtered by the equalizer.

8. The baseline wander compensating method according to claim 5, wherein the second calibration signal is the digital signal.

9. The baseline wander compensating method according to claim 8, wherein the second calibration signal is passed to a delay unit, so that the second calibration signal is delayed and simultaneous with the first calibration signal.

10. The baseline wander compensating method according to claim 4, wherein the predetermined value is set by a packet detector according to user's experience or condition of actual use.

11. The baseline wander compensating method according to claim 2, in the step of compensating the input signal according to the baseline calibration value generated from the calibrating calculation, wherein the baseline calibration value is converted to another analog signal by a digital-analog converter, and the input signal is compensated according to another analog signal.

12. A baseline calibration module, adapted for compensating baseline wander induced in an Ethernet transceiver, the baseline calibration module comprising:
   a packet detector, configured to operatively detect an output packet, and compare a detection result of the output packet and a predetermined value, and generate a control signal correspondingly; and
   a calibrating calculation unit, coupled to the packet detector to operatively select a first calibration signal or a second calibration signal, and based on the control signal execute a calibrating calculation for the selected one of the first calibration signal and the second calibration signal to generate a baseline calibration value which is used to compensate an input signal.

13. The baseline calibration module according to claim 12, wherein the calibrating calculation unit comprises:
   a multiplexer, coupled to the packet detector to operatively receive the first calibration signal and the second calibration signal; and
   a loop filter, coupled to the multiplexer and the packet detector;
   wherein the loop filter selects a first calibration parameter to execute the calibrating calculation for the first calibration signal selected by the multiplexer, or the loop filter selects a second calibration parameter to execute the calibrating calculation for the second calibration signal selected by the multiplexer.

14. The baseline calibration module according to claim 13, wherein when the output packet is a normal packet, based on the control signal the loop filter selects the first calibration parameter to execute the calibrating calculation for the first calibration signal selected by the multiplexer, and when the output packet is a killer packet, based on the control signal the loop filter selects the second calibration parameter to execute the calibrating calculation for the second calibration signal selected by the multiplexer, wherein the second calibration parameter is larger than the first calibration parameter.

15. The baseline calibration module according to claim 12, wherein the input signal is an analog signal, the baseline calibration module is coupled to an analog-digital converting unit, the analog-digital converting unit converts the analog signal into a digital signal and transmits the digital signal to the baseline calibration module.

16. The baseline calibration module according to claim 15, wherein the digital signal is transformed into a number sequence of the output packet by an equalizer and a slicer.

17. The baseline calibration module according to claim 16, wherein the first calibration signal is a signal generated from the digital signal being filtered by the equalizer.

18. The baseline calibration module according to claim 15, wherein the second calibration signal is generated from the digital signal.

19. The baseline calibration module according to claim 17, wherein the calibrating calculation unit further comprises:
a first subtractor, coupled to the equalizer to operatively calculate the output packet and the digital signal output from the equalizer to generate the first calibration signal.

20. The baseline calibration module according to claim 18, wherein the calibrating calculation unit further comprises:
a delay unit, coupled to the analog-digital converting unit, delaying the digital signal; and
a second subtractor, coupled to the delay unit to operatively calculate the delayed digital signal and the output packet to generate the second calibration signal.

21. The baseline calibration module according to claim 19, wherein the second calibration signal is passed to the delay unit, so that the second calibration signal is delayed and simultaneous with the first calibration signal.

22. The baseline calibration module according to claim 15, wherein the baseline calibration value is converted to the analog signal by a digital-analog converting unit and the input signal is compensated according to the analog signal.

23. An Ethernet transceiver, comprising:
an analog circuit, configured to receive an input signal, and output a digital signal based on the input signal, wherein the input signal is an analog signal;
a digital circuit, coupled to the analog circuit, comprising:
an equalizer;
a slicer, coupled to the equalizer, the digital signal being transformed into a number sequence of an output packet by the equalizer and the slicer; and
a baseline calibration module, coupled to the equalizer and the slicer, compensating baseline wander induced in the Ethernet transceiver, the baseline calibration module comprising:
a packet detector, configured to operatively detect the output packet, and compare a detection result of the output packet and a predetermined value, and generate a control signal correspondingly; and
a calibrating calculation unit, coupled to the packet detector to operatively select a first calibration signal or a second calibration signal, and based on the control signal execute a calibrating calculation for the selected one of the first calibration signal and the second calibration signal to generate of a baseline calibration value, wherein the analog circuit compensates the input signal based on the baseline calibration value.

\* \* \* \* \*